(12) United States Patent
Han et al.

(10) Patent No.: US 8,761,499 B2
(45) Date of Patent: Jun. 24, 2014

(54) SYSTEM AND METHOD FOR DETECTING GLOBAL HARMFUL VIDEO

(75) Inventors: Seung Wan Han, Daejeon (KR); Jae Deok Lim, Daejeon (KR); Byeong Cheol Choi, Daejeon (KR); Byung Ho Chung, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 195 days.

(21) Appl. No.: 13/306,215

(22) Filed: Nov. 29, 2011

(65) Prior Publication Data

US 2012/0134578 A1 May 31, 2012

(30) Foreign Application Priority Data

Nov. 30, 2010 (KR) ........................ 10-2010-0120385

(51) Int. Cl.
*G06K 9/62* (2006.01)
(52) U.S. Cl.
USPC ......................................................... 382/160
(58) Field of Classification Search
None
See application file for complete search history.

(56) References Cited

U.S. PATENT DOCUMENTS

| 7,734,096 B2* | 6/2010 | Lee et al. ....................... 382/190 |
| 2009/0094187 A1* | 4/2009 | Miyaki ............................. 707/1 |
| 2009/0274364 A1 | 11/2009 | Shakya et al. |

FOREIGN PATENT DOCUMENTS

| KR | 10-2008-0110064 | 12/2008 |
| KR | 10-2009-0057596 | 6/2009 |

* cited by examiner

*Primary Examiner* — Brian P Werner
(74) *Attorney, Agent, or Firm* — Staas & Halsey LLP (57) ABSTRACT

A system for detecting a global harmful video includes: a video determination policy generation unit for determining harmfulness of learning video segments from video learning information to analyze occurrence information of harmful learning video segments, and generating a global harmfulness determination policy based on the occurrence information; and a video determination policy execution unit for determining harmfulness of input video segments from information of an input video to analyze occurrence information of harmful input video segments, and determining whether the input video is harmful or not based on the occurrence information of the harmful input video segments and the global harmfulness determination policy.

18 Claims, 9 Drawing Sheets

FIG. 11

SYSTEM AND METHOD FOR DETECTING GLOBAL HARMFUL VIDEO

CROSS-REFERENCE(S) TO RELATED APPLICATION(S)

The present invention claims priority of Korean Patent Application No. 10-2010-0120385, filed on Nov. 30, 2010, which is incorporated herein by reference.

FIELD OF THE INVENTION

The present invention relates to a technique for detecting global harmful video; and, more particularly, to a system and method for detecting a global harmful video, which are suitable for determining whether an overall video is harmful or not by giving weights to occurrence frequency, occurrence continuity and occurrence probability of harmful portions based on determination results on harmfulness of frames, scenes, shots, clips or the like which constitute the video.

BACKGROUND OF THE INVENTION

As well-known in the art, the Internet, which is called the "sea of information", provides various types of information and user convenience enough to be a part of many people's daily life in modern society. Apart from the positive effects of the Internet in the social, economical, and academic aspects, indiscriminate distribution of harmful information using the characteristics of openness, interconnectivity, and anonymity of the Internet has emerged to become serious social problems.

In particular, minors are exposed to harmful information even more frequently than before through the Internet which can be accessed any time. Such an environment misleads minors who still have immature value judgment and feeble self-control, harmfully affecting them emotionally and mentally. Thus, a method for blocking harmful information is required in order to prevent minors or those who do not want to see from being exposed to such harmful information.

Conventional methods for determining a harmful video include a metadata and text information-based blocking technique, a hash and database-based blocking technique, a content-based blocking technique and the like.

The metadata and text information-based blocking technique determines harmfulness of a video by analyzing harmfulness of text included in a title, a file name and descriptions of multimedia. This method has a high over-blocking rate and a high erroneous blocking rate.

The hash and database-based blocking technique calculates hash values of existing harmful videos to make a database thereof, and calculates a hash value of a new input video to compare the calculated hash value with those in the previously established database, thereby determining harmfulness of the input video. This approach is problematic in that the size of the hash value database increases in proportion to the number of harmful videos, and the calculational load necessary for the determination of harmfulness increases in proportion to the length of a video. Also, it is difficult to detect even a known harmful video when the hash value of the known harmful video has been changed by slight modification.

The content-based determination technique which has been recently introduced analyzes contents of a harmful video to extract features thereof, generates a harmfulness classification model from the features, and determines harmfulness of an input video based on the previously generated harmfulness classification model. This method can resolve the high over-blocking rate and high erroneous blocking rate that appear in the metadata and text-based blocking technique, and also resolve the problem of the database size and the calculational load exhibited in the hash and database-based blocking technique.

However, in most of the content-based determination techniques, harmfulness of content of segments (frames, scenes, shots, clips or the like) constituting a harmful video is analyzed and corresponding values are again learned to generate a model so as to be used as a reference for later determination or when an occurrence frequency of harmful elements of a video is greater than a threshold value, the video is determined to be harmful. This approach appears to have high accuracy compared to other existing methods, but since a video segment determination algorithm thereof cannot derive absolutely reliable results, there still exists a problem that over-blocking or erroneous blocking of the entire video occurs.

Figure 1:
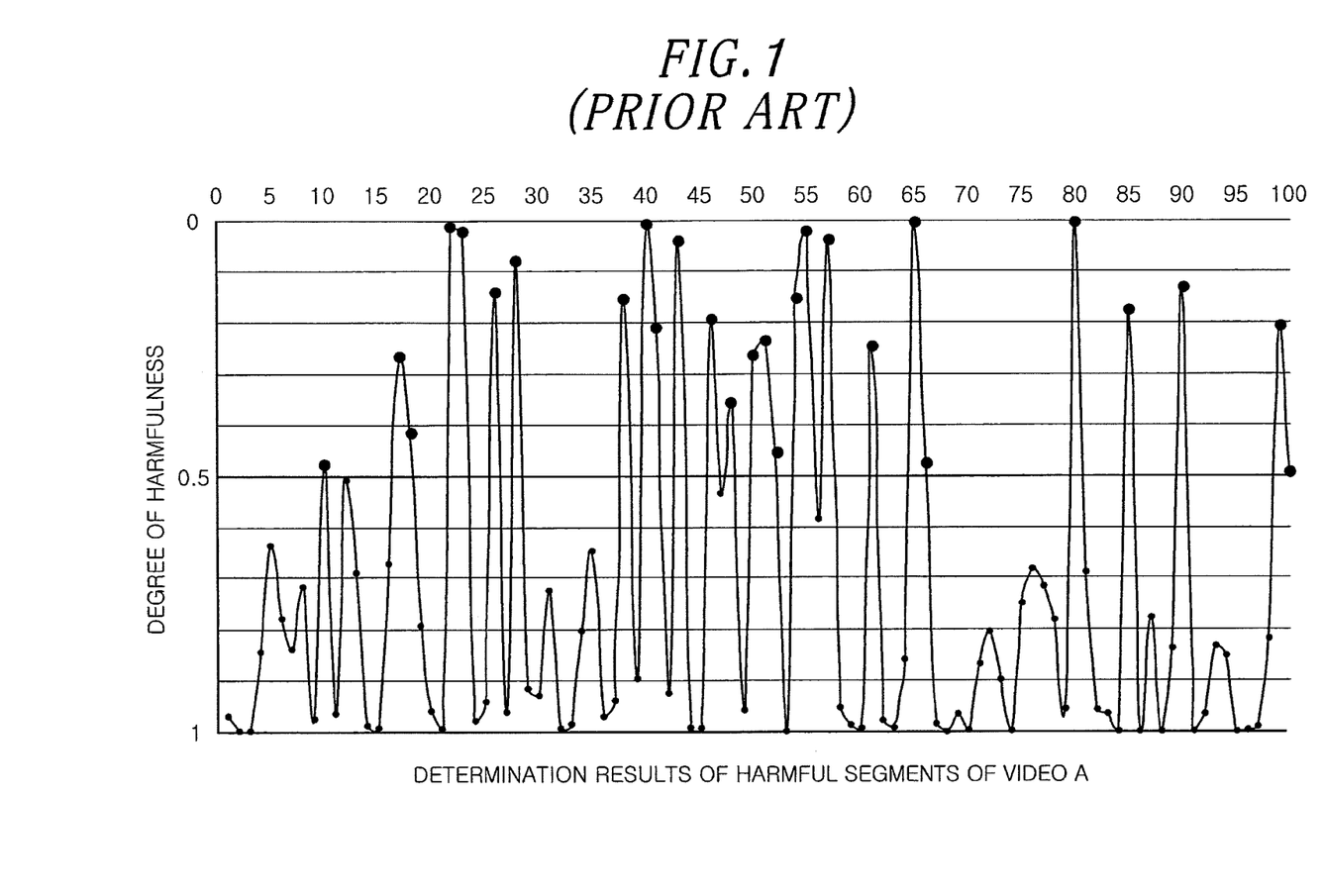
FIG. 1 is a graph exemplarily showing a result of determination on harmful segments of video A.
Figure 2:
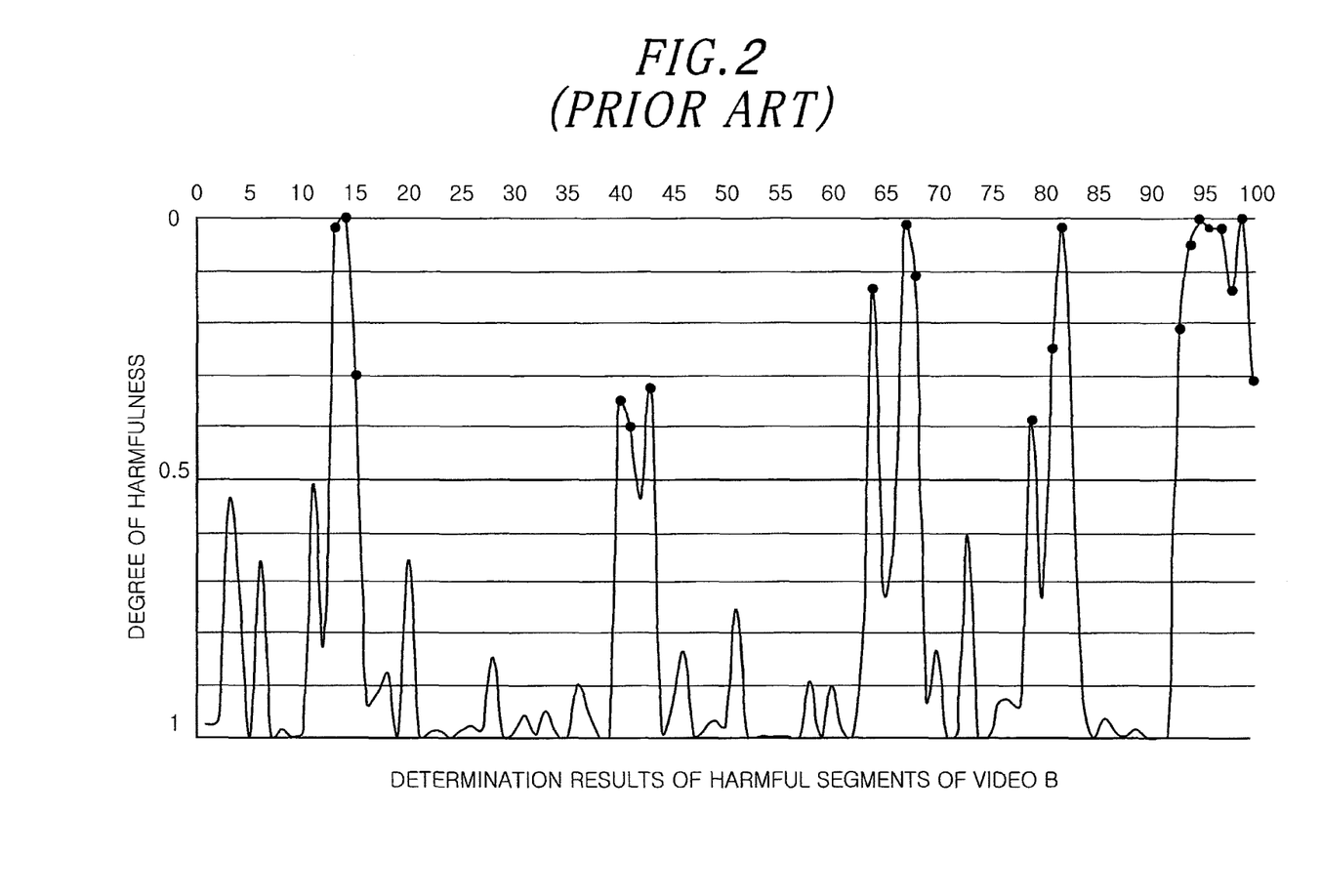
FIG. 2 is a graph exemplarily showing a result of determination on harmful segments of video B.

As an example, it is assumed that a video segment determination algorithm determines that video A composed of 100 segments includes 28 harmful segments, as shown in FIG. 1, and video B composed of 100 different segments includes 20 harmful segments, as shown in FIG. 2.

FIG. 1 is a graph exemplarily showing the results of determination on harmful segments of video A, and FIG. 2 is a graph exemplarily showing the results of determination on harmful segments of video B, which will help understand the conventional methods.

According to the conventional methods, video A will be determined to be more harmful than video B because it has more harmful segments than video B. However, an actual experiment and video analysis show that the above conclusion is not always correct due to an error of the video segment determination algorithm. In particular, as the accuracy of the video segment determination algorithm is low, the determination of harmfulness simply based on occurrence frequencies of the harmful segments has a higher error rate.

Figure 3:
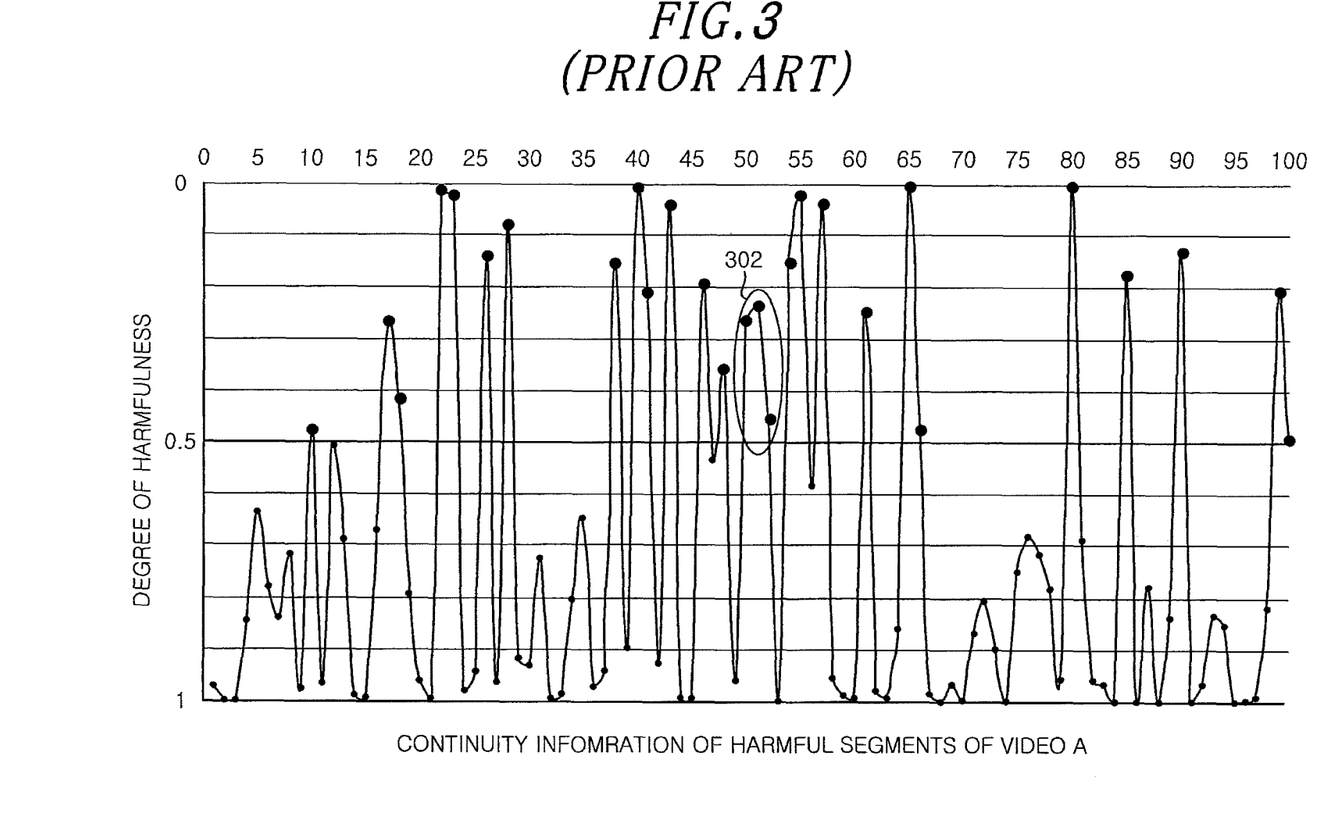
FIG. 3 is a graph exemplarily showing a result of determination on continuity information of harmful segments of video A.
Figure 4:
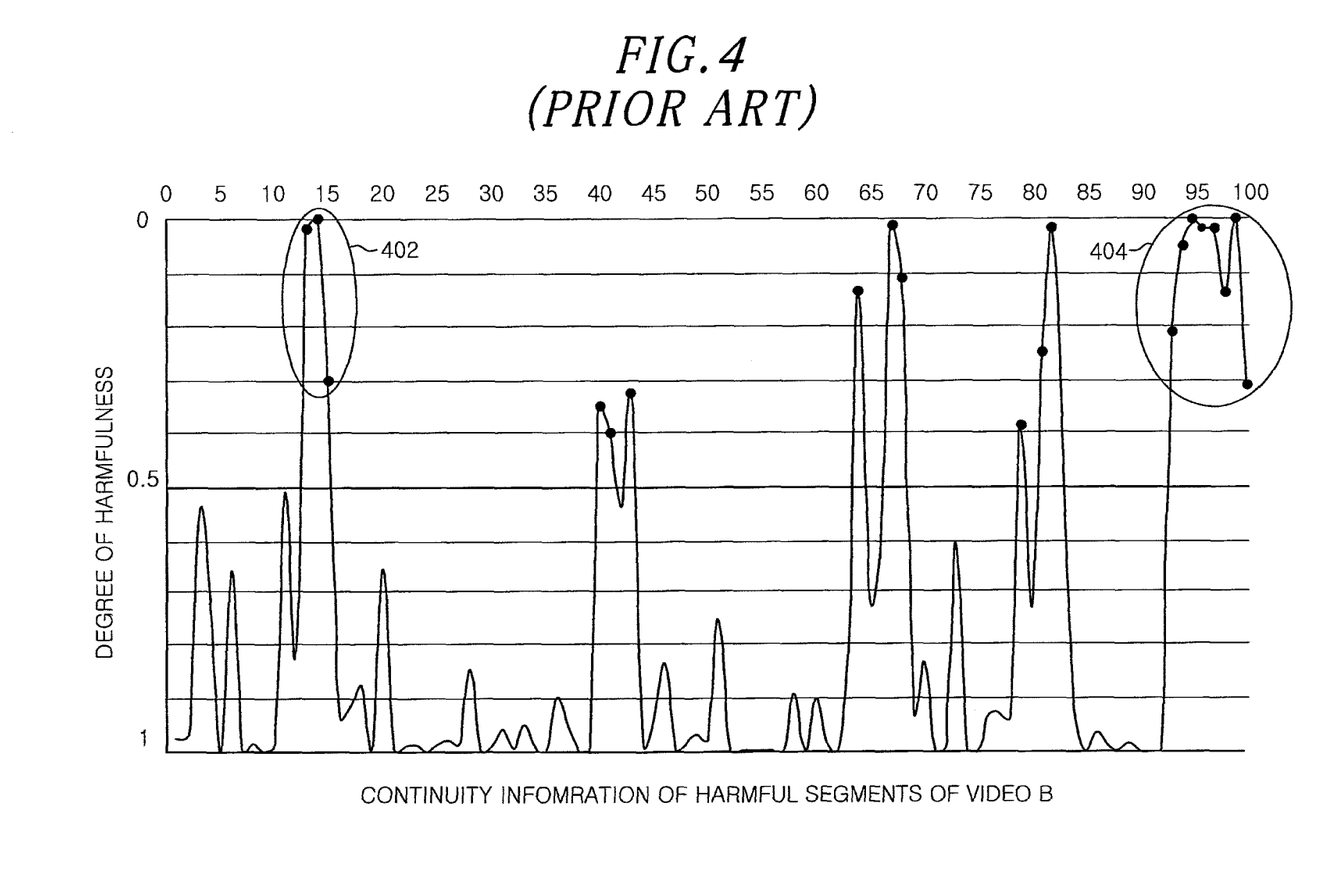
FIG. 4 is a graph exemplarily showing a result of determination on continuity information of harmful segments of video B.

However, if considering information on occurrence continuities of harmful segments from the video segment determination results, for example, if considering continuity information 302 of video A and continuity information 402 and 404 of video B, as shown in FIGS. 3 and 4, respectively, it may be determined that video B is more harmful than video A. This analysis can be considered to be accurate in spite of the error of the video segment determination algorithm, when the fact that most harmful scenes (exposure, masturbation, sex, and the like) appear continuously in actual harmful videos is taken into consideration. Here, FIG. 3 is a graph exemplarily showing the determination results on continuity information of harmful segments of video A, and FIG. 4 is a graph exemplarily showing the determination results on continuity information of harmful segments of video B.

Therefore, in order to lower the over-blocking rate and erroneous blocking rate in the method for determining a harmful video based on the video segment determination algorithm including an error, it is required to determine harmfulness of the entire video by utilizing information on the occurrence frequencies, occurrence continuities and the like of harmful segments from the video segment determination results.

SUMMARY OF THE INVENTION

In view of the above, the present invention provides a system and method for detecting a global harmful video, which are suitable for determining whether an overall video is harmful or not by giving weights to occurrence frequency, occurrence continuity and occurrence probability of harmful segments based on determination results on harmfulness of segments constitute the video.

In accordance with a first aspect of the present invention, there is provided a system for detecting a global harmful video, the system including:

a video determination policy generation unit for determining harmfulness of learning video segments from video learning information to analyze occurrence information of harmful learning video segments among the learning video segments, and generating a global harmfulness determination policy based on the analyzed occurrence information; and a video determination policy execution unit for determining harmfulness of input video segments from information of an input video to analyze occurrence information of harmful input video segments among the input video segments, and determining whether the input video is harmful or not based on the analyzed occurrence information of the harmful input video segments and the generated global harmfulness determination policy.

In accordance with a second aspect of the present invention, there is provided a method for detecting a global harmful video, the method including:

determining harmfulness of learning video segments from video learning information;

analyzing occurrence information of harmful learning video segments among the learning video segments based on the harmfulness determination results of the learning video segments;

generating a global harmfulness determination policy based on the occurrence information of the harmful learning video segments;

determining harmfulness of input video segments from information of an input video;

analyzing occurrence information of the harmful input video segments among the input video segments based on the harmfulness determination results of the input video segments; and finally determining global harmfulness of the input video based on the analyzed occurrence information of the harmful input video segments and the generated global harmfulness determination policy.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Hereinafter, an embodiment of the present invention will be described in detail with the accompanying drawings which form a part hereof.

Figure 5:
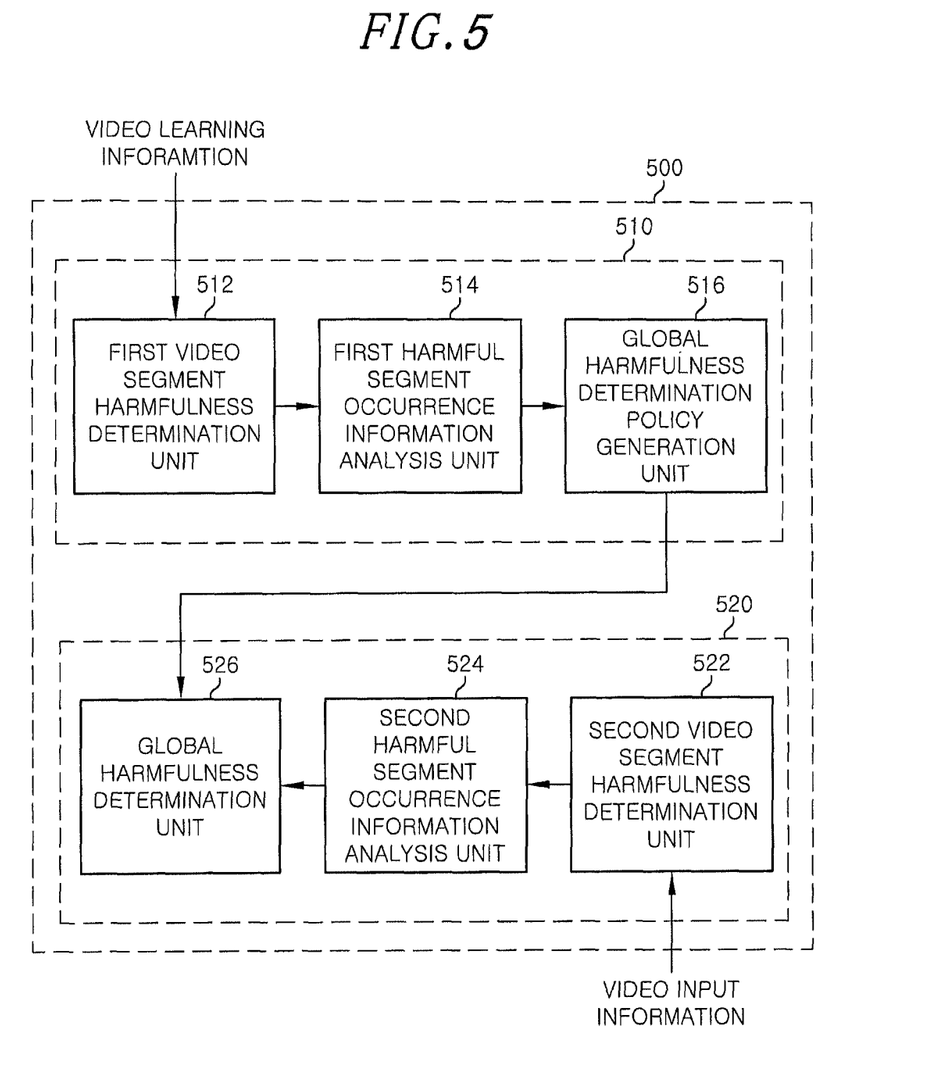
FIG. 5 shows a block diagram of a system for detecting a global harmful video in accordance with an embodiment of the present invention.

FIG. 5 illustrates a block diagram of a system for detecting a global harmful video in accordance with an embodiment of the present invention. The system roughly includes a video determination policy generation unit 510 and a video determination policy execution unit 520.

Referring to FIG. 5, the video determination policy generation unit 510 determines harmfulness of learning video segments from video learning information to analyze occurrence information of harmful segments in the learning video segments. Here, the video learning information includes a set of harmful videos and a set of harmless videos which are already known about their harmfulness or harmlessness.

Occurrence frequencies, occurrence continuities and occurrence probability values of the harmful segments are derived from the analysis on the occurrence information, and based on those, the video determination policy generation unit 510 generates a global harmfulness determination policy. The generated global harmfulness determination policy is delivered to the video determination policy execution unit 520.

The video determination policy generation unit 510 includes a first video segment harmfulness determination unit 512, a first harmful segment occurrence information analysis unit 514, and a global harmfulness determination policy generation unit 516.

First, the first video segment harmfulness determination unit 512 determines harmfulness of the learning video segments (e.g., frames, scenes, shots, clips, and the like) from the video learning information, and transfers the harmfulness determination results to the first harmful segment occurrence information analysis unit 514. Here, the determination on harmfulness of the learning video segments may be performed by using a hash-based discrimination method, a content-based discrimination method, or a semantic-based discrimination method, each of which is well known in the art. For example, a method for determining harmfulness based on a mechanical learning, which defines harmful features of an image, a video, and an audio from the segments and learns the features to determine harmfulness of each segment, may be taken as an example.

Next, the first harmful segment occurrence information analysis unit 514 analyzes the occurrence information of the harmful segments from the harmfulness determination results provided from the first video segment harmfulness determination unit 512. The analysis result is delivered to the global harmfulness determination policy generation unit 516. The first harmful segment occurrence information analysis unit 514 includes, as shown in FIG. 6, an occurrence frequency and location calculator 5142, an occurrence continuity calculator 5144, and an occurrence probability calculator 5146.

Figure 6:
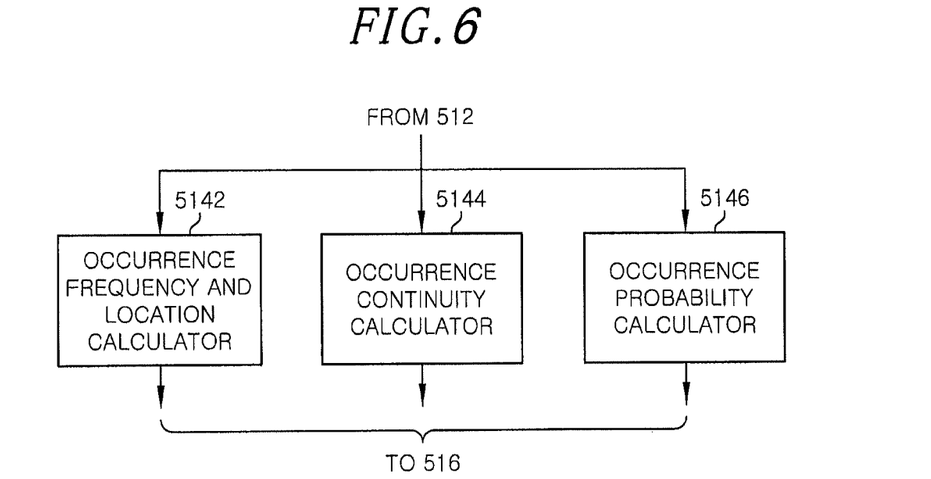
FIG. 6 illustrates a detailed block diagram of a harmful segment occurrence information analysis unit shown in FIG. 5.

Referring to FIG. 6, the occurrence frequency and location calculator 5142 calculates information about the occurrence frequencies of the harmful segments and the locations of the occurrence thereof based on the harmfulness determination results of the learning video segments, and transfers the calculation results to the global harmfulness determination policy generation unit 516.

Figure 10:
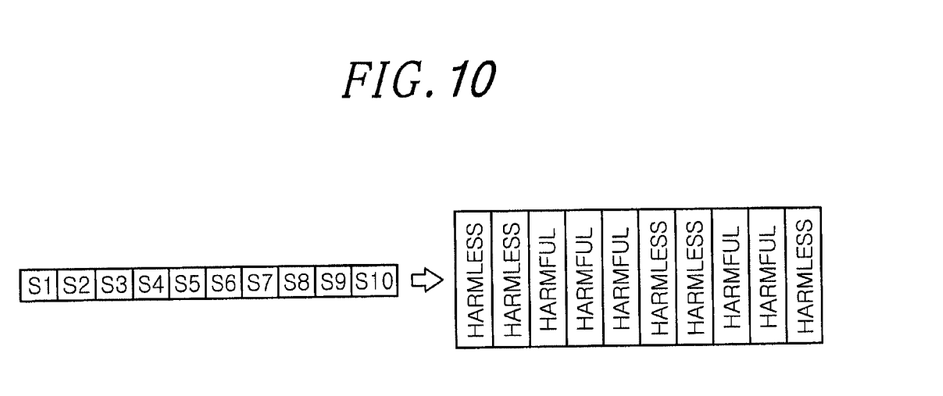
FIG. 10 is an exemplary view showing harmful and harmless segments from a determination result of harmfulness of learning video segments.

For example, as shown in FIG. 10, when it is assumed that a total of five segments of video M1 are determined to be harmful segments, the occurrence frequency and location calculator 5142 calculates occurrence locations (index3, index4, index5, index8, index9) of the respective harmful segments (s3, s4, s5, s8 and s9), and delivers the calculated locations to the global harmfulness determination policy generation unit 516.

The occurrence continuity calculator 5144 assigns occurrence continuities to the harmful segments which successively appear, and provides the same to the global harmfulness determination policy generation unit 516.

As an example, as shown in FIG. 10, when it is assumed that a total of five segments of video M1 are determined to be harmful segments, the occurrence continuity calculator 5144 assigns occurrence continuity of 3 to segments s3 to s5 where the harmful segments appear successively, and assigns occurrence continuity of 2 to segments s8 and s9 where the harmful segments appear successively.

The occurrence probability calculator 5146 calculates occurrence probability values of the harmful segments by combining harmfulness probability values (prob3, prob4, prob5, prob8 and prob9) of the harmful segments (s3, s4, s5, s8 and s9) with the occurrence continuities, and transfers the calculated occurrence probability values to the global harmfulness determination policy generation unit 516.

Referring back to FIG. 5, the global harmfulness determination policy generation unit 516 generates a global harmfulness determination policy by determining importance and weights of the occurrence frequencies, importance and weights of the occurrence continuities, and importance and weights of the occurrence probability values based on the occurrence information (occurrence frequencies and locations, occurrence continuities, and occurrence probability values) of the harmful segments analyzed by the first harmful segment occurrence information analysis unit 514. The generated global harmfulness determination policy is sent to the video determination policy execution unit 520.

Figure 7:
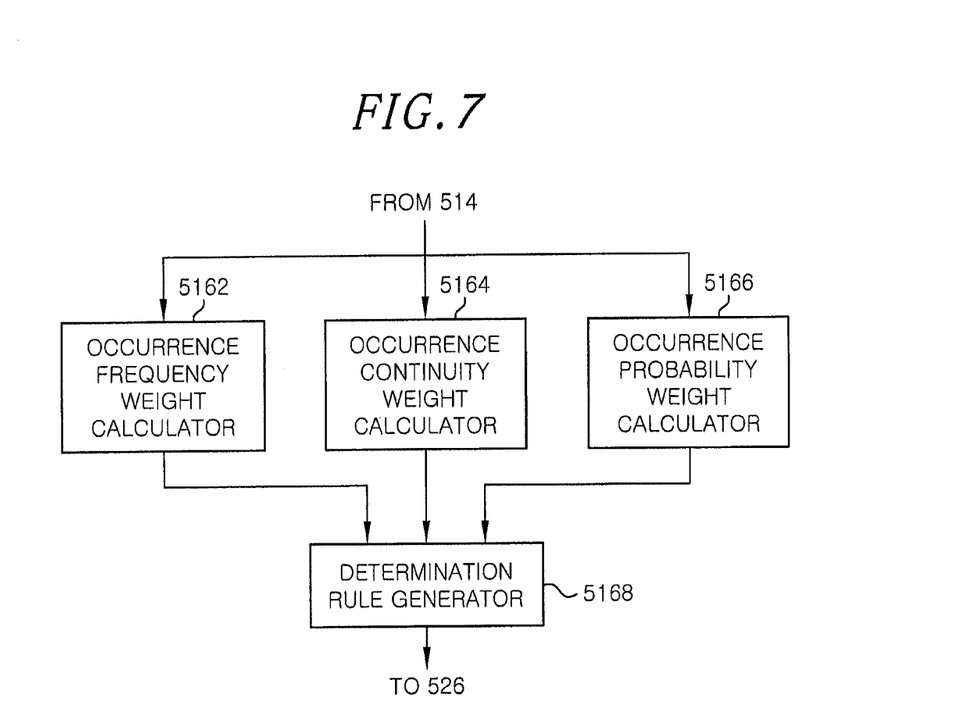
FIG. 7 presents a detailed block diagram of a global harmfulness determination policy generation unit shown in FIG. 5.

The global harmfulness determination policy generation unit 516 includes, as shown in FIG. 7, an occurrence frequency weight calculator 5162, an occurrence continuity weight calculator 5164, an occurrence probability weight calculator 5166 and a determination rule generator 5168.

Figure 11:
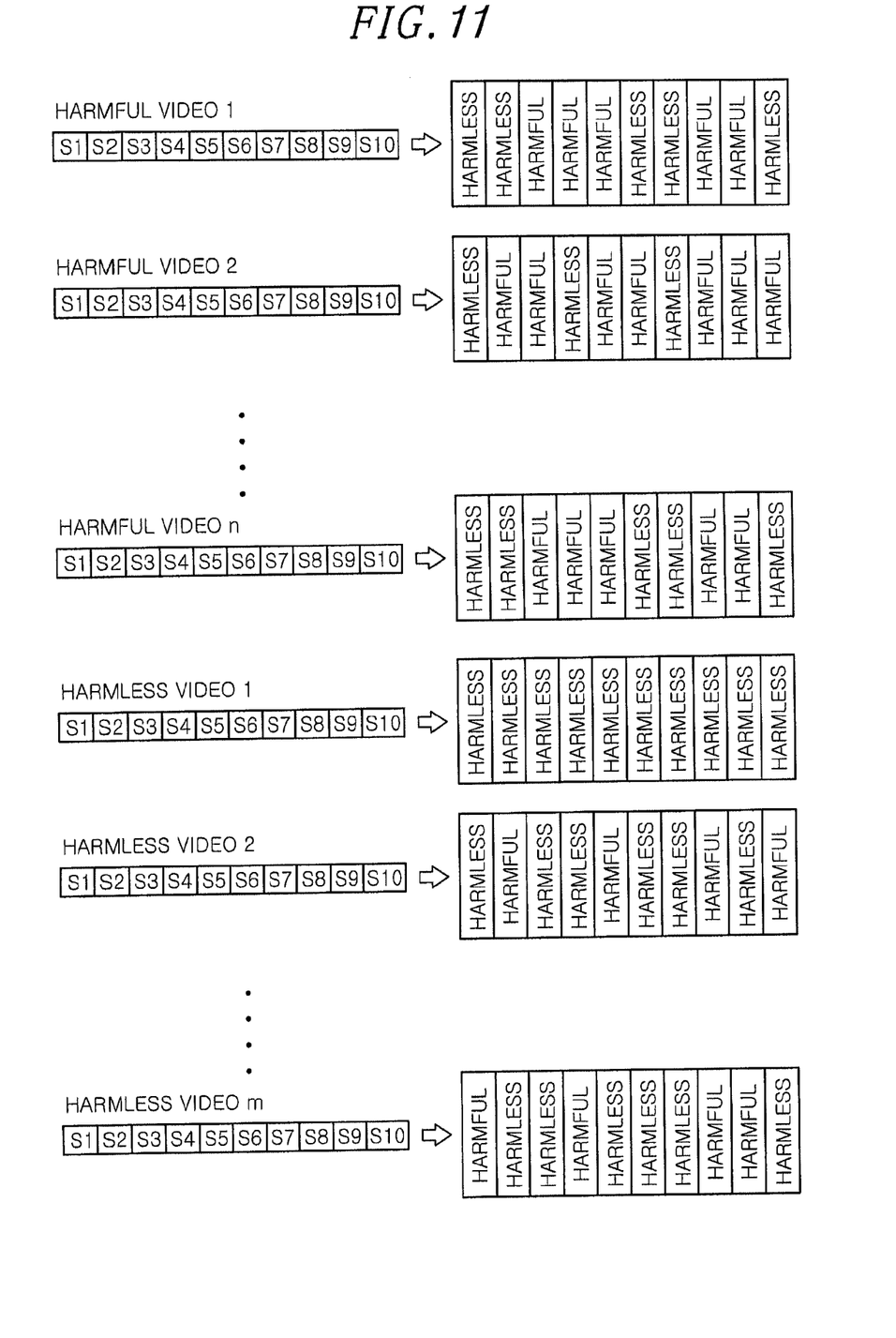
FIG. 11 is an exemplary view showing a set of harmful videos and a set of harmless videos including harmful segments and harmless segments.

Before describing the functions of the components of the global harmfulness determination policy generation unit 516, referring to FIG. 11, it is seen that the learning video may be classified into a set of harmful videos and a set of harmless videos, and each video includes harmful segments and harmless segments as a result of harmfulness determination of the segments.

Referring to FIG. 7, the occurrence frequency weight calculator 5162 calculates occurrence frequencies of the harmful segments in each of the set of harmful videos and the set of harmless videos to determine weights, which are to be used for determination on harmfulness/harmlessness, according to statistics for each of the sets and the calculated occurrence frequencies of the harmful segments. The determined weight values are provided to the determination rule generator 5168.

The occurrence continuity weight calculator 5164 calculates weights for the number of occurrence continuities of the harmful segments based on the occurrence continuities of the harmful segments in each of the set of the harmful videos and the set of the harmless videos, and delivers the calculated weights to the determination rule generator 5168. For example, the occurrence continuity weight calculator 5164 may assign weight w1 to occurrence continuity 2 of the harmful segments, weight w2 to occurrence continuity 3 of the harmful segments, and weight w3 to occurrence continuity 4 of the harmful segments.

The occurrence probability weight calculator 5166 calculates weights of occurrence probability values with respect to harmfulness and harmlessness based on occurrence probability values of the respective segments in each of the set of the harmful videos and the set of the harmless videos, and delivers the calculated weights to the determination rule generator 5168.

Then, the determination rule generator 5168 generates rules R1, R2, . . . , Rn (i.e., global harmfulness determination policy) based on an analysis of characteristics of the harmful and harmless videos and the provided weights, i.e., the weights of the occurrence frequencies, the weights of occurrence continuities, and the weights of occurrence probability values. The generated rules are sent to a global harmfulness determination unit 526 of the video determination policy execution unit 520.

Referring again to FIG. 5, the video determination policy execution unit 520 determines harmfulness of input video segments from video input information desired to be determined whether it is harmful or not and analyzes occurrence information of harmful segments in the input video segments. Further, the video determination policy execution unit 520 determines whether the video is harmful or not based on the analyzed occurrence information of the harmful segments and the global harmfulness determination policy provided from the global harmfulness determination policy generation unit 516.

The video determination policy execution unit 520 includes a second video segment harmfulness determination unit 522, a second harmful segment occurrence information analysis unit 524 and the global harmfulness determination unit 526.

The second video segment harmfulness determination unit 522 determines harmfulness of input video segments (e.g., frames, scenes, shots, clips and the like) from video input information desired to be determined whether it is harmful or not, and delivers the harmfulness determination results of the respective input video segments to the second harmful segment occurrence information analysis unit 524. Here, the determination on the harmfulness of the input video segments may be performed by using the hash-based discrimination method, the content-based discrimination method, or the semantic-based discrimination method, similarly to that in the first video segment harmfulness determination unit 512.

Next, the second harmful segment occurrence information analysis unit 524 analyzes occurrence information of the harmful segments based on the harmfulness determination results delivered from the second video segment harmfulness determination unit 522, and delivers the analysis results to the global harmfulness determination unit 526.

The second harmful segment occurrence information analysis unit 524 may be configured to include such components (an occurrence frequency and location calculator, an occurrence continuity calculator and an occurrence probability calculator) shown in FIG. 6, like the above-described first harmful segment occurrence information analysis unit 514. Thus, in order to avoid redundancy, a description of a detailed configuration of the second harmful segment occurrence information analysis unit 524 will be omitted for the sake of brevity.

The global harmfulness determination unit 526 finally determines global harmfulness of the input video based on the analyzed occurrence information (occurrence frequencies and locations, occurrence continuities, and occurrence probability values) of the harmful segments delivered from the second harmful segment occurrence information analysis unit 524 and the global harmfulness determination policy provided from the global harmfulness determination policy generation unit 516.

Figure 8:
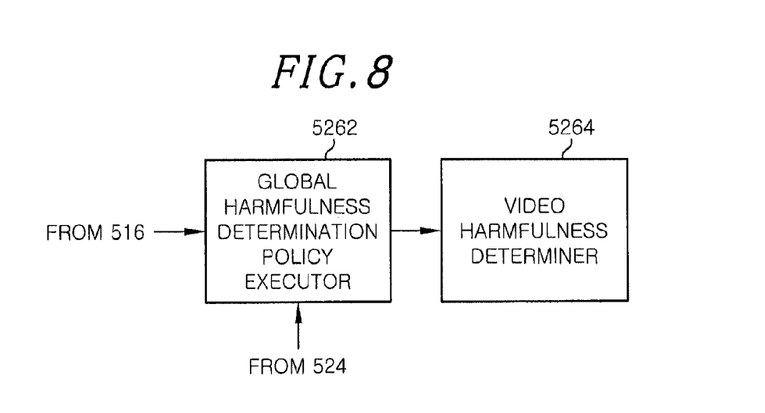
FIG. 8 depicts a detailed block diagram of a global harmfulness determination unit shown in FIG. 5.

The global harmfulness determination unit 526 includes a global harmfulness determination policy executor 5262 and a video harmfulness determiner 5264, as shown in FIG. 8.

Referring to FIG. 8, the global harmfulness determination policy executor 5262 executes the global harmfulness determination policy provided from the global harmfulness determination policy generation unit 516 in association with the occurrence information of the harmful segments provided from the second harmful segment occurrence information analysis unit 524, and delivers the execution results to the video harmfulness determiner 5264.

The video harmfulness determiner 5264 finally determines harmfulness of the video based on the execution results of the global harmfulness determination policy provided from the global harmfulness determination policy executor 5262.

Now, a series of processes of detecting a global harmful video using the harmful video detection system of the present invention having the above-described configuration while taking into consideration the weights of local determination results will be described in detail, mainly with reference to FIG. 9.

Figure 9:
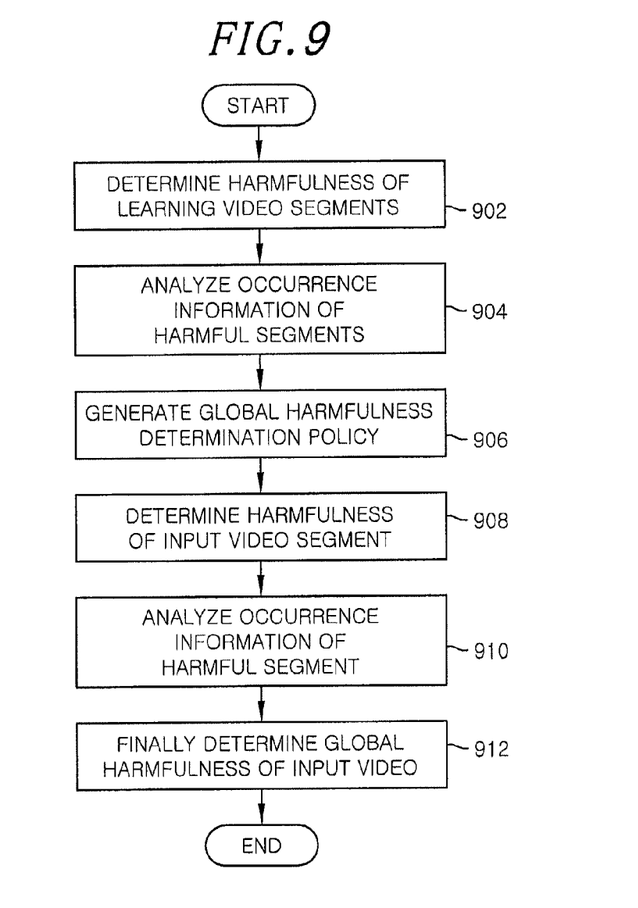
FIG. 9 is a flowchart illustrating a major process of detecting a global harmful video in consideration of weights of local determination results in accordance with the embodiment of the present invention.

FIG. 9 is a flowchart illustrating a major process of detecting a global harmful video in consideration of the weights of local determination results in accordance with the embodiment of the present invention.

Referring to FIG. 9, the first video segment harmfulness determination unit 512 determines, in step 902, harmfulness of learning video segments from video learning information by using, for example, any one of the hash-based discrimination method, the content-based discrimination method, and the semantic-based discrimination method.

Next, in step 904, the first harmful segment occurrence information analysis unit 514 analyzes occurrence information of the harmful segments among the learning video segments, based on the harmfulness determination results of the learning video segments. More specifically, the first harmful segment occurrence information analysis unit 514 calculates the occurrence frequencies and occurrence locations of the harmful segments, assigns occurrence continuities to successive harmful segments, and calculates the occurrence probability values of the harmful segments by combining harmfulness probability values of the harmful segments with the occurrence continuities.

Then, since the video learning information includes a set of harmful videos and harmless videos which are already known about their harmfulness or harmlessness, the global harmfulness determination policy generation unit 516 analyzes the tendency of each of the sets based on the occurrence information of the harmful segments in each of the sets, and generates a global harmfulness determination policy by determining weights of each piece of the occurrence information in step 906.

More specifically, the global harmfulness determination policy generation unit 516 calculates the occurrence frequencies of the harmful segments in each of the set of the harmful videos and the set of the harmless videos to determine weights based on statistics for each of the sets and the calculated occurrence frequencies of the harmful segments, and calculates weights with respect to the number of the occurrence continuities of the harmful segments based on the occurrence continuities of the harmful segments in each of the sets. Further, the global harmfulness determination policy generation unit 516 calculates weights of occurrence probability values with respect to harmfulness and harmlessness based on the occurrence probability values of respective segments in each of the sets, and generates the global harmfulness determination policy based on the calculated weights and analysis results of characteristics of the harmful and harmless videos.

The global harmfulness determination policy created through the above-described procedure is transferred to the global harmfulness determination unit 526.

Next, a video desired to be determined whether it is harmful or not is inputted and the second video segment harmfulness determination unit 522 determines, in step 908, harmfulness of input video segments from input information of the video, by using, for example, any one of the hash-based discrimination method, the content-based discrimination method, and the semantic-based discrimination method.

Subsequently, the second harmful segment occurrence information analysis unit 524 analyzes occurrence information of harmful segments among the input video segments based on the harmfulness determination results of the input video segments in step 910. More specifically, the second harmful segment occurrence information analysis unit 524 calculates occurrence frequencies and occurrence locations of the harmful segments, assigns occurrence continuities to successive harmful segments, and calculates occurrence probability values of the harmful segments by combining harmfulness probability values of the harmful segments with the occurrence continuities.

Finally, the global harmfulness determination unit 526 determines global harmfulness of the input video based on the occurrence information of the harmful segments in the input video obtained from the second harmful segment occurrence information analysis unit 524 and the global harmfulness determination policy generated by the global harmfulness determination policy generation unit 516 in step 912.

In accordance with the present invention, a global harmfulness determination policy is generated by assigning weights to occurrence frequencies, occurrence continuities and occurrence probability values of harmful segments included in learning video. Further, global harmfulness of an input video is determined based on the global harmfulness determination policy and occurrence information of harmful segments included in the input video, thereby enhancing accuracy of the determination of harmfulness of the entire video.

While the invention has been shown and described with respect to the embodiments, it will be understood by those skilled in the art that various changes and modification may be made without departing from the scope of the invention as defined in the following claims.

What is claimed is:

1. A system for detecting a global harmful video, the system comprising:
    at least one processor configured to:
        determine harmfulness of learning video segments from video learning information to analyze occurrence information of harmful learning video segments among the learning video segments, and generate a global harmfulness determination policy based on the analyzed occurrence information; and determine harmfulness of input video segments from information of an input video to analyze occurrence information of harmful input video segments among the input video segments, and determine whether the input video is harmful or not based on the analyzed occurrence information of the harmful input video segments and the generated global harmfulness determination policy, wherein the at least one processor is further configured to determine harmfulness of the learning video segments;

analyze the occurrence information of the harmful learning video segments based on the harmfulness determination results of the learning video segments to thereby derive occurrence frequencies, occurrence continuities and occurrence probability values of the harmful learning video segment; and generate the global harmfulness determination policy by determining weights for each of the occurrence frequencies, the occurrence continuities and the occurrence probability values of the harmful learning video segments.

2. The system of claim 1, wherein the at least one processor is further configured to determine the harmfulness of the learning video segments by using a hash-based discrimination method.

3. The system of claim 1, wherein the at least one processor is further configured to determine the harmfulness of the learning video segments by using a content-based discrimination method.

4. The system of claim 1, wherein the at least one processor is further configured to determine the harmfulness of the learning video segments by using a semantic-based discrimination method.

5. The system of claim 1, wherein the at least one processor is further configured to:
   calculate the occurrence frequencies of the harmful learning video segments and locations of the occurrences;
   assign the occurrence continuities to the harmful learning video segments which successively appear; and
   calculate the occurrence probability values of the harmful learning video segments by combining harmfulness probability values of the harmful learning video segments with the occurrence continuities.

6. The system of claim 1, wherein the video learning information includes a set of harmful videos and a set of harmless videos, and the at least one processor is further configured to
   an calculate occurrence frequencies of the harmful learning video segments in each of the set of harmful videos and the set of harmless videos to thereby determine weights for the occurrence frequencies in each of the sets;
   calculate weights for the number of the occurrence continuities based on the occurrence continuities of the harmful learning video segments in each of the sets;
   calculate weights for the occurrence probability values with respect to harmfulness and harmlessness based on the occurrence probability values of respective segments in each of the sets; and
   generate the global harmfulness determination policy, based on the calculated weights regarding the occurrence frequencies, occurrence continuities and the occurrence probability values and results obtained by analyzing features of the harmful and harmless videos.

7. The system of claim 1, wherein the at least one processor is further configured to:
   determine harmfulness of the input video segments;
   analyze occurrence information of the harmful input video segments based on the harmfulness determination results of the input video segments; and
   finally determine harmfulness of the input video based on the analyzed occurrence information of the harmful input video segments and the generated global harmfulness determination policy.

8. The system of claim 7, wherein the at least one processor is further configured to determine the harmfulness of the input video segments by using a hash-based discrimination method.

9. The system of claim 7, wherein the at least one processor is further configured to determine the harmfulness of the input video segments by using a content-based discrimination method.

10. The system of claim 7, wherein the at least one processor is further configured to determine the harmfulness of the input video segments by using a semantic-based discrimination method.

11. The system of claim 7, wherein the at least one processor is further configured to:
    calculate the occurrence frequencies of the harmful input video segments and locations of the occurrences;
    assign occurrence continuities to the harmful input video segments which successively appear; and
    calculate the occurrence probability values of the harmful input video segments by combining harmfulness probability values of the harmful input video segments with the occurrence continuities.

12. The system of claim 7, wherein the at least one processor is further configured to:
    execute the global harmfulness determination policy in association with the occurrence information of the harmful input video segments; and
    finally determine harmfulness of the input video based on the execution results of the global harmfulness determination policy.

13. A method for detecting a global harmful video, the method comprising:
    determining harmfulness of learning video segments from video learning information;
    analyzing, executed by a processor, occurrence information of harmful learning video segments among the learning video segments based on the harmfulness determination results of the learning video segments;
    generating a global harmfulness determination policy based on the occurrence information of the harmful learning video segments;
    determining harmfulness of input video segments from information of an input video;
    analyzing occurrence information of the harmful input video segments among the input video segments based on the harmfulness determination results of the input video segments; and
    finally determining global harmfulness of the input video based on the analyzed occurrence information of the harmful input video segments and the generated global harmfulness determination policy,
    wherein said analyzing the occurrence information of the harmful learning video segments includes:
    calculating occurrence frequencies of the harmful learning video segments and locations of the occurrences;
    assigning occurrence continuities to the harmful learning video segments which successively appear; and calculating occurrence probability values of the harmful learning video segments by combining harmfulness probability values of the harmful learning video segments with the occurrence continuities.

14. The method of claim 13, wherein said determining the harmfulness of the learning video segments and the input video segments is performed by using a hash-based discrimination method.

15. The method of claim 13, wherein said determining the harmfulness of the learning video segments and the input video segments is performed by using a content-based discrimination method.

16. The method of claim 13, wherein said determining the harmfulness of the learning video segments and the input video segments is performed by using a semantic-based discrimination method.

17. The method of claim 13, wherein the video learning information includes a set of harmful videos and a set of harmless videos, and said generating the global harmfulness determination policy includes:

calculating occurrence frequencies of the harmful learning video segments in each of the set of harmful videos and the set of harmless videos to thereby determine weights for the occurrence frequencies in each of the sets;

calculating weights for the number of the occurrence continuities based on the occurrence continuities of the harmful learning video segments in each of the sets;

calculating weights for the occurrence probability values with respect to harmfulness and harmlessness based on the occurrence probability values of respective segments in each of the sets; and generating the global harmfulness determination policy, based on the calculated weights regarding the occurrence frequencies, occurrence continuities and the occurrence probability values and results obtained by analyzing features of the harmful and harmless videos.

18. The method of claim 13, wherein said analyzing the occurrence information of the harmful input video segments includes:

calculating the occurrence frequencies of the harmful input video segments and locations of the occurrences;

assigning occurrence continuities to the harmful input video segments which successively appear; and calculating the occurrence probability values of the harmful input video segments by combining harmfulness probability values of the harmful input video segments with the occurrence continuities.

* * * * *